United States Patent [19]

Kemmner et al.

[11] Patent Number: 4,556,490

[45] Date of Patent: Dec. 3, 1985

[54] ARRANGEMENT FOR FEEDING OF FUEL

[75] Inventors: Ulrich Kemmner, Stuttgart; Wolfgang Soyer, Wiernsheim, both of Fed. Rep. of Germany

[73] Assignee: Robert Bosch GmbH, Stuttgart, Fed. Rep. of Germany

[21] Appl. No.: 586,093

[22] Filed: Mar. 5, 1984

[30] Foreign Application Priority Data

Mar. 19, 1983 [DE] Fed. Rep. of Germany ....... 3309971

[51] Int. Cl.[4] ............................................. B01D 35/02

[52] U.S. Cl. ................................ 210/349; 210/416.4; 210/455; 210/497.01; 123/511

[58] Field of Search ...................... 210/167, 349, 416.1, 210/416.4, 451, 455, 497.01, 497.3, 509, DIG. 11; 417/540, 541, 542, 543; 123/457, 460, 465, 511, DIG. 10

[56] References Cited

U.S. PATENT DOCUMENTS

| | | | |
|---|---|---|---|
| 2,094,457 | 9/1937 | Lattner | 210/349 |
| 2,182,933 | 12/1939 | Schimanek | 123/511 |
| 2,978,990 | 4/1961 | Lewis | 210/416.4 |
| 3,071,251 | 1/1963 | Szwargulski | 210/349 |
| 3,072,258 | 1/1963 | Saxby | 210/349 |
| 3,805,958 | 4/1974 | Campbell | 210/349 |
| 3,837,497 | 10/1974 | Smith | 210/349 |
| 3,912,423 | 10/1975 | Pfabe | 210/416.4 |
| 4,256,579 | 3/1981 | Rose et al. | 210/349 |
| 4,395,988 | 8/1983 | Knapp et al. | 123/511 |
| 4,420,396 | 12/1983 | Yamamoto et al. | 210/416.4 |
| 4,491,111 | 1/1985 | Eheim et al. | 123/460 |

FOREIGN PATENT DOCUMENTS

| | | | |
|---|---|---|---|
| WO82/0111-40 | 4/1982 | PCT Int'l Appl. | 210/349 |
| 2080695 | 2/1982 | United Kingdom | 210/416.4 |

*Primary Examiner*—Richard V. Fisher

*Assistant Examiner*—Wanda L. Millard

*Attorney, Agent, or Firm*—Michael J. Striker

[57] ABSTRACT

An arrangement for feeding fuel, advantageously from a supply tank to an internal combustion engine, particularly of a power vehicle has a feed aggregate through which a fuel flows, and a structural element arranged in a fuel flow and including a filter part and a fuel pressure wave damping member, wherein the structural element is arranged in a housing which surrounds the feed aggregate.

13 Claims, 5 Drawing Figures

ARRANGEMENT FOR FEEDING OF FUEL

BACKGROUND OF THE INVENTION

The present invention relates to an arrangement for feeding fuel. More particularly, it relates to an arrangement for feeding fuel, advantageously from a supply tank to an internal combustion engine, particularly of a power vehicle.

Feeding arrangements of the above mentioned general type are known in the art. A known arrangement has a feed aggregate through which a fuel flows, and a structural element arranged in a fuel stream and including a filter part and a member which dampens pressure waves in the fuel stream. In the known arrangement, the structural element which simultaneously contains the filter part and the pressure wave damping member is arranged in a fuel feeding conduit. Thus the arrangement is designed in such a manner that it requires not only a space for the structural element, but also a mounting freedom which is not frequently available.

SUMMARY OF THE INVENTION

It is an object of the present invention to provide an arrangement for feeding of fuel which avoids the disadvantages of the prior art.

In keeping with these objects and with others which will become apparent hereinafter, one feature of the present invention resides, briefly stated, in an arrangement for feeding of fuel, in which the structural element is arranged in a housing which surrounds the feed aggregate.

When the arrangement is designed in accordance with the present invention, the structural element is integrated in the feed aggregate so that the required insertion of the feed aggregate into the power vehicle all respective mounting steps are completed. The insertion of the structural element which is formed especially simple, into the feed aggregate takes place during its mounting where the considerations of space are not limiting. Dirtying of the susceptible pump aggregate during transportation, mounting and service handling is thereby excluded.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
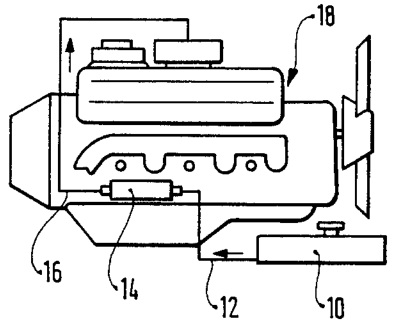
FIG. 1 is a view schematically showing an arrangement with a fuel supply tank, a fuel feed aggregate, and an internal combustion engine.

FIG. 1 shows a fuel supply tank 10 which is connected via a suction conduit 12 with a suction side of a fuel feed aggregate 14. A pressure conduit 16 is connected with the pressure side of the fuel feed aggregate 14 and leads to an internal combustion engine 18. During the operation of the internal combustion engine, the fuel feed aggregate 14 conveys the fuel from the supply tank 10 to the internal combustion engine, which for example can be arranged in a motor chamber of a not shown power vehicle.

Figure 2:
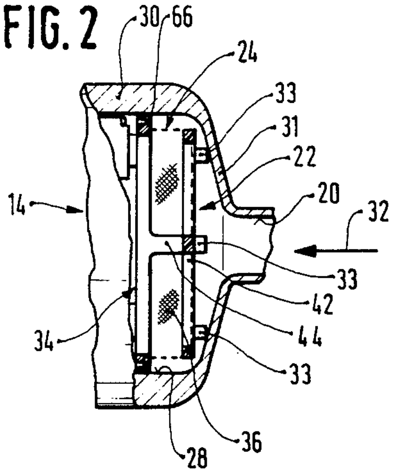
FIG. 2 is a view showing a partial section through the region of the feed aggregate, in which a structural element with a filter part and a pressure wave damping member is arranged.
Figure 3:
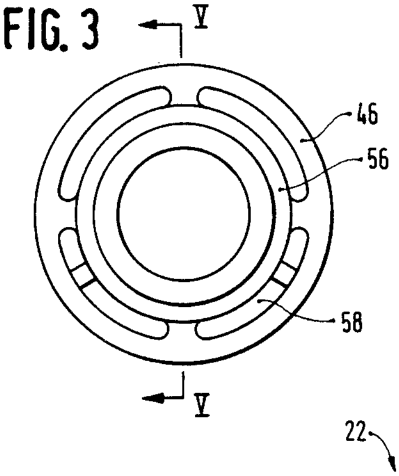
FIG. 3 is a view showing the structural element of FIG. 10 in a plan view, on an enlarged scale.
Figure 4:
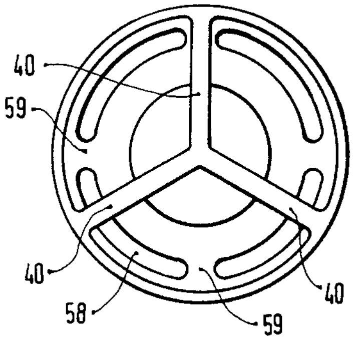
FIG. 4 is a view from above of the structural element according to FIG. 3, wherein seal parts belonging to the filter parts are removed.
Figure 5:
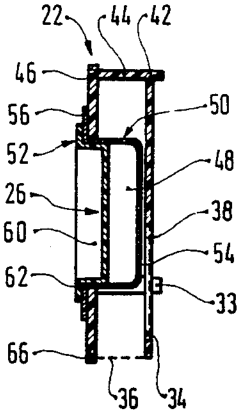
FIG. 5 is a view showing a section of the structural element according to FIG. 3, taken along the line V—V.

As can be seen from FIG. 2, the fuel feed aggregate 14 has a suction opening 20. A structural element 22 is arranged near the suction opening 20. It has a filter part 24 and a damping member 26 more clearly shown in FIG. 5 for damping pressure waves of the fuel flow. The structural element 22 is disk-shaped and supported on an inner wall 28 of a housing 30. The housing 30 surrounds both a not shown feed pump of the feed aggregate and the structural element 22. The structural element 22 is arranged in the housing 30 such that, when seen in a flow direction of the fuel identified by reference numeral 32, it is located centrally behind the suction opening 20 of the fuel feed aggregate 14. The structural element 22 is supported in the flow direction 32 of the fuel. For guaranteeing a disturbance-free onflow of the structural element 22, it is supported relative to an end wall 31 of the housing 30, opposite to the flow direction, with the aid of projections 33.

As can be seen from FIGS. 2–5, the structural element has a supporting frame 34 of a synthetic plastic material. Sieve parts 36 and 38 which serve as a filter element, are mounted on the supporting frame 34. The supporting frame 34 in accordance with the shown embodiment has three spoke-like bars 40 located in one plane and connected with one another at its outer ends by a supporting ring 42. A spacer 44 extends from the supporting ring 42 to a holding ring 46 shown in FIG. 5 and arranged concentrically to the supporting ring 42 at a distance therefrom. The damping member 26 is arranged inside the holding ring 46. It is substantially formed by a gas-filled chamber 48. The chamber 48 is closed by two housing parts 50 and 52. The housing part 50 is connected with the holding ring 46, advantageously formed on it, and has a cup-shaped cross-section. It is arranged on the supporting frame 34 so that its cup bottom 54 is located close to the bars 40. The housing part 50 is provided with cup edge 56 which extends outwardly and abuts against or transits into the holding ring 46.

The other housing part 52 has a punched central region 60 so as to form a cover whose edge 62 abuts against the cup edge 56. In the transitional region between the cup edge 56 and the holding ring 36, segment-shaped cut-out 58 are provided to guarantee an orderly passage of the fuel through the structural element 22. The holding ring 46 is sectionally connected by webs 59 remaining between the cut-outs 58 with the cup edge 56. A cover edge 62 is fixedly connected with the cup edge 56. Both the supporting frame 34 with the bars 40, the supporting ring 42, the spacers 44 and the holding rings 46 are made of synthetic plastic material which has a certain elasticity. The housing part 50 is formed so thin that it is elastic in membrane-like manner. The housing part 52 has a firm structure and connected by its cover edge 62 with the cup edge 56 by gluing, welding or ultrasound in a nondetachable manner.

The opening formed by the supporting ring 42 is closed by a disk-shaped sieve part 38 which forms together with a tubular sieve part 36 the filter part 24. The filter part 24 can be formed, however, as a one-piece member, so that it can be replaced in prefabricated state over the supporting frame 34 and connected with the latter. As particularly shown in FIG. 5, the damping member 26 is located substantially inside the cup-shaped filter part 24. As can be further seen from FIG. 5, the outer edge of the holding ring 46 extends outwardly beyond the filter part 36 and is formed as a sealing lip 66 which tightly abuts against the inner wall 28 of the housing 30.

In deviation from the above described example, it is also possible to arrange the structural element 22 in a separate housing which forms a part of the fuel feed conduits 12 or 16.

When the fuel to be fed enters in direction of the arrow 32 through the suction opening 20 the fuel feed aggregate, it flows through the filter part 24 or the sieve disk 36 and the sieve pipe 38 through the cut-out 58 to a not shown feed pump. During the throughflow, the pressure waves which take place in the fuel are smoothed with the aid of the damping member 26. In deviation from the above described embodiment it is also possible that, instead of the above described sieve part 36, a so-called star filter is arranged on the supporting frame 34.

It will be understood that each of the elements described above, or two or more together, may also find a useful application in other types of constructions differing from the types described above.

While the invention has been illustrated and described as embodied in an arrangement for feeding fuel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for feeding fuel, for example from a supply tank to an internal combustion engine of a power vehicle, comprising a feed aggregate through which a fuel flows; a structural element arranged in the fuel flow and having a supporting frame, and a filter part and a fuel pressure wave damping member arranged on said supporting frame, said damping member having two housing parts which enclose a gas-filled chamber, one of said housing parts being formed on said supporting frame of one-piece with the latter and having an cup-shaped cross-section with a cup bottom located inside said supporting frame and a cup edge connected with the latter, the other of said housing parts being formed as a carrier insertable into said one cup-shaped part and having an annular edge which abuts against said cup edge of said one housing part and is connected with the same; and a housing element surrounding the feed aggregate, wherein said structural element is located in said housing element.

2. An arrangement as defined in claim 1, wherein said structural element is supported in a flow direction of fuel; and further comprising means for supporting said structural element in the flow direction of fuel.

3. An arrangement as defined in claim 1, wherein said supporting frame which supports said filter part and said damping member is composed of a synthetic plastic material.

4. An arrangement as defined in claim 1, wherein said supporting frame has a plurality of spoke-like bars arranged at a distance from the outer surface of said cup bottom substantially parallel to the latter, a supporting ring with which said bars are connected, a holding ring located in the plane of said cup edge as well as surrounding and connected in sections with the latter, and at least three spacers connecting said supporting ring with said holding ring.

5. An arrangement as defined in claim 4, wherein said plurality of said spoke-like bars includes three such bars.

6. An arrangement as defined in claim 4, wherein said filter part has a sieve pipe which surrounds said spacers.

7. An arrangement as defined in claim 6, wherein said sieve pipe of said filter part is mounted on said spacers.

8. An arrangement as defined in claim 6, wherein said filter part has a sieve disk mounted on said bars having a diameter determined in correspondence with the diameter of said sieve pipe.

9. An arrangement as defined in claim 8, wherein said sieve pipe and said sieve disk of said filter part is formed of one piece with one another.

10. An arrangement as defined in claim 1, wherein said feed aggregate has a suction region, said structural element being arranged in said suction region.

11. An arrangement as defined in claim 1, wherein said feed aggregate has a suction opening, said structural element being arranged, as seen in a flow direction of the fuel, behind said suction opening of said feed aggregate and centrically to the latter.

12. An arrangement as defined in claim 1, wherein said filter part is cup-shaped, said damping member being arranged substantially inside said cup-shaped filter part.

13. An arrangement for feeding fuel, for example from a supply tank to an internal combustion engine of a power vehicle, comprising a feed aggregate through which a fuel flows; a structural element arranged in the fuel flow and having a supporting frame, and a filter part and a fuel pressure wave damping member arranged on said supporting frame, said damping member having two housing parts which enclose a gas-filled chamber, one of said housing parts being formed on said supporting frame of one-piece with the latter and having a cup-shaped cross-section with a cup bottom located inside said supporting frame and a cup edge connected with the latter, the other of said housing parts being formed as a carrier insertable into said one cup-shaped part and having an annular edge which abuts against said cup edge of said one housing part and is connected with the same, said filter part having a sieve pipe, and said supporting frame having a holding ring which has an outer edge extending outwardly beyond said sieve pipe and formed as a sealing lip, said housing having an inner wall against which said sealing lip abuts.

* * * * *